Patented Apr. 20, 1926.

1,581,638

UNITED STATES PATENT OFFICE.

RICHARD JUST, OF LUDWIGSHAFEN-ON-THE-RHINE, KARL WILKE, OF HOCHST-ON-THE-MAIN, AND PAUL NAWIASKY, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

BLACK VAT DYESTUFF COMPOSITION.

No Drawing.   Application filed January 26, 1925. Serial No. 4,956.

*To all whom it may concern:*

Be it known that we, RICHARD JUST, KARL WILKE, and PAUL NAWIASKY, citizens the first two of the German Empire and the third of Austria, residing the first and third at Ludwigshafen-on-the-Rhine and the second at Hochst-on-the-Main, Germany, have invented new and useful Improvements in Black Vat Dyestuff Composition, of which the following is a specification.

We have found that mixtures of dibenzanthrone and nitro-dibenzanthrone are very suitable for directly producing black dyeings possessing very good fastness, including fastness to chlorine which property is surprising in view of the fact that the green dyeings of the nitro-dibenzanthrone contained in the mixture when treated with hypochlorite solution turn black, and accordingly a substantial change of the mixed color was to be expected.

The proportions of the two dyestuffs may be widely different depending upon the special shade of the black dyeings desired and upon whether pure or crude dyestuffs are mixed. With pure dibenzanthrone (either revatted or prepared in accordance with the German specification 290,079) and pure nitro-dibenzanthrone (see U. S. Patent No. 1,513,851) compositions giving valuable black shades contain a more or less preponderating quantity of dibenzanthrone, for example between 55 per cent and 90 per cent of pure dibenzanthrone and between 45 per cent and 10 per cent of pure nitro-dibenzanthrone. With revatted dibenzanthrone and impure nitro derivative, as it is obtained by nitrating crude dibenzanthrone, other proportions may be found more proper, for example 10 parts of dibenzanthrone and 40 parts of nitrated product may give a product directly dyeing valuable black shades. Besides, a small quantity of a yellowish or other suitable vat dyestuff may be added in order to produce the desired shade of the black color. The aforesaid dyestuffs-composition may be made either by simply mixing the single dyestuffs in the proportions desired, or by nitrating dibenzanthrone under suituble conditions to produce a product that contains the required percentage of nitro-compound. For example, dibenzanthrone may be treated with nitric acid of a strength insufficient to dissolve the dyestuff which strength however may vary within rather wide limits, and preferably while adding substances capable of destroying any nitrous acid which may be formed, such for example as urea, urea salts, hydrazine hydrate and others, or by employing concentrated nitric acid, preferably with a suitable diluent in a proper quantity to effect the incomplete nitration desired. By varying the proportions and the concentration of the nitric acid or the kind of the solvent or diluent used, the specific shade of black or the dyeings produced with the aid of the product may be varied within certain limits, depending upon whether more bluish black shades or more greenish black shades are desired.

The invention is more fully illustrated by the following examples to which, however, the invention is not limited. The parts are by weight.

*Example 1.*

Mix together 13 parts of nitro-dibenzanthrone (see U. S. Letters Patent No. 1,513,851) and 87 parts of pure dibenzanthrone which may be obtained either by revatting dibenzanthrone or according to the process described in the specification of German Patent No. 290,079. A seven per cent dyeing of the aforesaid composition represents a bluish black with a slightly reddish cast and possesses excellent fastness to chlorine.

With a product composed of 2 parts of pure dibenzanthrone and 1 part of the nitro-dibenzanthrone, black shades are produced with a lesser reddish tinge. Ordinary raw dibenzanthrone or raw nitro-dibenzanthrone (see Patent 796,393) may be used in correspondingly altered proportions.

*Example 2.*

10 parts of dibenzanthrone are mixed with 40 parts of nitric acid of 33 degrees Baumé (about 47 per cent $HNO_3$), and the mixture is stirred or shaken for an hour at ordinary temperature while there is a slight self-heating and development of nitrose vapors. The product is finished in the usual way and gives a violet red vat from which cotton is directly dyed a black shade with a greenish tinge. When aqueous sulfuric acid be present, the reaction proceeds in a similar way.

*Example 3.*

Add to 40 parts of nitric acid of 41 degrees Baumé (about 65 per cent $HNO_3$) 1 part of hydrazine hydrate and then, while cooling, 10 parts of dibenzanthrone and stir, while cooling, for half an hour and subsequently for an hour or an hour and a half at ordinary temperature. Nitrose vapors will not be observed during the reaction but an evolution of nitrogen instead. The product after being filtered and washed forms a bluish paste which from a reddish violet vat dyes cotton black shades with a violet tinge and good fastness to chlorine.

*Example 4.*

100 parts of pure dibenzanthrone are suspended in 600 parts of nitrobenzene and 14 parts of an 82 per cent nitric acid added at 30 degrees centigrade. The mixture is then kept at 65 degrees centigrade for two hours and the nitrobenzene then removed, for example my distilling with steam. A six per cent dyeing on cotton of the dyestuff produced shows a black shade. The nitration may also be effected in other solvents or diluents including sulfuric acid of say 96 per cent or 80 per cent.

We claim:

As a new composition of matter a black vat dyestuff comprising dibenzanthrone and nitro-dibenzanthrone in a proportion proper to directly produce from a vat, black dyeings on cotton.

In testimony whereof we have hereunto set our hands.

RICHARD JUST.
KARL WILKE.
PAUL NAWIASKY.